(12) United States Patent
Cruz-Hernandez et al.

(10) Patent No.: US 9,760,171 B2
(45) Date of Patent: Sep. 12, 2017

(54) SYSTEM AND METHOD FOR CONTROLLING AUDIO OUTPUT ASSOCIATED WITH HAPTIC EFFECTS

(71) Applicant: IMMERSION CORPORATION, San Jose, CA (US)

(72) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/728,673

(22) Filed: Jun. 2, 2015

(65) Prior Publication Data

US 2016/0070350 A1   Mar. 10, 2016

Related U.S. Application Data

(63) Continuation of application No. 10/983,231, filed on Nov. 8, 2004, now abandoned.

(60) Provisional application No. 60/590,432, filed on Jul. 23, 2004.

(51) Int. Cl.
*G06F 3/01* (2006.01)

(52) U.S. Cl.
CPC ...... *G06F 3/016* (2013.01); *A63F 2300/1037* (2013.01); *A63F 2300/6081* (2013.01)

(58) Field of Classification Search
CPC .. G06F 3/016; G06F 3/167; A63F 2300/1037; A63F 2300/6081; G10H 1/00; G10H 1/344

USPC ........ 345/156–173; 340/407.1, 384.6, 384.7; 455/466; 84/730; 367/180; 381/190
See application file for complete search history.

(56) References Cited

U.S. PATENT DOCUMENTS

| 4,334,280 A | 6/1982 | McDonald |
| 4,355,348 A | 10/1982 | Williams |
| 4,768,412 A | 9/1988 | Sanderson |
| 4,771,344 A | 9/1988 | Fallacaro et al. |
| 5,388,992 A | 2/1995 | Franklin et al. |
| 5,437,608 A | 8/1995 | Cutler |
| 5,438,529 A | 8/1995 | Rosenberg et al. |
| 5,451,924 A | 9/1995 | Massimino et al. |

(Continued)

FOREIGN PATENT DOCUMENTS

WO    WO 0227705 A1 * 4/2002 ............. G06F 3/016

OTHER PUBLICATIONS

Gillespie, Brent, "The Virtual Piano Action: Design and Implementation," Center for Computer Research in Music and Acoustics, 1994, 4 pages.

(Continued)

*Primary Examiner* — Vinh Lam

(74) *Attorney, Agent, or Firm* — Miles & Stockbridge, P.C.

(57) ABSTRACT

An apparatus, a processor-readable medium, and a method are provided that are configured to cause a haptic effect and an audio effect to be output substantially concurrently. The haptic effect has a frequency and the audio effect has a frequency different from the frequency of the haptic effect. At least one of the frequency of the haptic effect and the frequency of the audio effect is varied while maintaining substantially constant an average energy of the haptic effect. Varying the frequency of the audio effect can cause a perceived frequency of the haptic effect to change.

21 Claims, 10 Drawing Sheets

(56) References Cited

U.S. PATENT DOCUMENTS

| | | | |
|---|---|---|---|
| 5,669,818 | A | 9/1997 | Thorner et al. |
| 5,684,722 | A | 11/1997 | Thorner et al. |
| 5,737,144 | A | 4/1998 | Ataee et al. |
| 5,754,095 | A * | 5/1998 | Bader .................. B06B 1/0276 340/384.7 |
| 5,842,162 | A | 11/1998 | Fineberg |
| 5,857,986 | A | 1/1999 | Moriyasu |
| 6,160,489 | A * | 12/2000 | Perry ..................... G08B 6/00 340/7.6 |
| 6,275,213 | B1 | 8/2001 | Tremblay et al. |
| 6,285,351 | B1 | 9/2001 | Chang et al. |
| 6,292,776 | B1 | 9/2001 | Chengalvarayan |
| 6,422,941 | B1 * | 7/2002 | Thorner ................. A63F 13/02 273/148 B |
| 6,496,115 | B2 | 12/2002 | Arakawa |
| 6,703,550 | B2 | 3/2004 | Chu |
| 6,885,876 | B2 | 4/2005 | Aaltonen et al. |
| 6,963,762 | B2 | 11/2005 | Kaaresoja et al. |
| 7,136,051 | B2 * | 11/2006 | Hein .................... H03K 17/962 345/156 |
| 7,161,580 | B2 | 1/2007 | Bailey et al. |
| 7,421,088 | B2 * | 9/2008 | Cranfill ................. B06B 1/045 381/190 |
| 7,446,752 | B2 | 11/2008 | Goldenberg et al. |
| 2001/0036868 | A1 * | 11/2001 | Roy ....................... A47C 3/02 472/130 |
| 2002/0121966 | A1 * | 9/2002 | Woodard ................ G08B 3/10 340/384.6 |
| 2003/0067440 | A1 * | 4/2003 | Rank ..................... G06F 3/016 345/156 |
| 2003/0068053 | A1 * | 4/2003 | Chu ....................... G06F 3/016 381/118 |
| 2005/0047621 | A1 * | 3/2005 | Cranfill ................. B06B 1/045 381/334 |
| 2005/0216867 | A1 * | 9/2005 | Marvit .................. G06F 1/1613 715/863 |

OTHER PUBLICATIONS

"VibeTonz System", Immersion Corporation, 2004, pp. 1-6.

Kirman, Jacob H., "Tactile Perception of Computer-Derived Formant Patterns From Voiced Speech," J. Acoust. Soc. Am., vol. 55, No. 1, Jan. 1974, pp. 163-169.

Reed, Charlotte M. et al., "Research on Tactile Communication of Speech: A Review," ASHA Monographs, No. 20, 1982, pp. 1-23.

Snibbe, Scott S., "Haptic Techniques for Media Control," In Proceeding of the 14$^{th}$ Annual ACM Symposium on User Interface Software and Technology, 2001, pp. 1-10.

* cited by examiner

SYSTEM AND METHOD FOR CONTROLLING AUDIO OUTPUT ASSOCIATED WITH HAPTIC EFFECTS

CROSS-REFERENCE TO RELATED APPLICATIONS

This application is a continuation application of U.S. patent application Ser. No. 10/983,231, entitled "System and Method for Controlling Audio Output Associated with Haptic Effects," filed Nov. 8, 2004, which claims the benefit under 35 U.S.C. 119(e) of U.S. Provisional Application Ser. No. 60/590,432, entitled "System and Method for Controlling Audio Output Associated with Haptic Effects," filed Jul. 23, 2004, both of which are incorporated herein by reference in their entireties.

FIELD

The invention relates generally to haptic feedback devices. More specifically, the invention relates to a system and method for controlling audio output associated with haptic effects.

BACKGROUND

Devices that provide haptics, such as tactile feedback, have enjoyed increased popularity in recent years. These devices are used in a variety of different applications. For example, devices providing haptics are popular in various applications, where the haptic feedback enhances the overall gaming experience of a user. For example, haptic-enabled controllers, such as mouse devices, can be configured to provide haptic feedback to a user while the user interacts with an operating system (OS), or other application.

Existing devices, however, do not effectively control audio output associated with haptic feedback. Accordingly, it would be desirable to control effectively audio output associated with haptic effects.

SUMMARY

A system and method for controlling audio output associated with haptic effects are described. More specifically, audio output associated with haptic effects can be controlled to modify a perceived experience of the haptic effects. For example, by modifying the audio output, a user can be made to perceive a frequency of a haptic effect as being different than the actual frequency.

According to one or more embodiments of the invention, control signals can be configured to cause haptic effects to be output across a wide range of frequencies. These control signals can independently control haptic effects within any frequency range from among multiple frequency ranges. This can occur, for example, using either a single controller or multiple controllers configured to output control signals from each frequency range. For example, a single controller can output control signals that independently control haptic effects in each of multiple frequency ranges. Alternatively, multiple controllers can be used, such that each controller outputs control signals within a single frequency range of multiple frequency ranges, each controller being uniquely associated with each frequency range.

Audio output associated with a haptic effect is generated in at least one frequency range of multiple frequency ranges when that haptic effect is substantially concurrently output in response to a corresponding control signal. For example, when a haptic effect is output by a haptic device in response to a control signal, the haptic device can also create audible sound or, in other words, an audio output based on the movement of the haptic device. The audio signal heard by a user can correspond to a frequency of a haptic effect that is beyond the tactile detection capabilities of the user. In other words, although a user cannot feel a difference in the frequency of a haptic effect above a certain threshold frequency, the user can hear audio associated with such higher frequencies. Thus, although varying such tactile-imperceptible frequencies will not cause a user to feel a difference in a frequency of a haptic effect, the user will be able to hear such a variation. Because a user can hear an increase or decrease in frequency of the audio output, the user will perceive that the haptic effect has changed, and in many cases will believe that he or she has felt the change in the overall experience.

One or more embodiments of the invention provide an extended perceived frequency range of haptic effects. More specifically, in addition to the range of haptic effects that can be tactilely detected by the user, a range of effects that are detected audibly by a user can be added such that the perceived overall experience has a greater frequency range. Because a user is able to sense an increased range of frequencies, more information can be communicated to the user using such combination of haptic effects and audio output.

When pulse-like control signals are used to generate haptic effects, control signals having a substantially constant average energy can be used to provide a variety of different audio output frequencies. The different audio output frequencies can cause a user to believe that he or she is sensing tactilely a different frequency of a haptic effect, even though tactilely sensing such a difference would not be possible. Thus, according to one or more embodiments of the invention, a variety of overall experiences (each having a haptic component and an audio component) caused by a corresponding variety of control signals, each of which has substantially the same average energy, is able to be sensed by a user via a combination of the haptic effect and the associated audio output, even though the variety of haptic effects alone would be perceived as having the same feel without the audio output. The average energy can be maintained substantially constant by varying the frequency and/or duty cycle of a control signal inversely with the magnitude of a control signal. Thus, as the frequency of the control signal is increased, the magnitude decreases and, conversely, as the frequency of the control signal decreases, the magnitude increases, to maintain a substantially constant average energy of the carrier signal.

DETAILED DESCRIPTION

Figure 1:
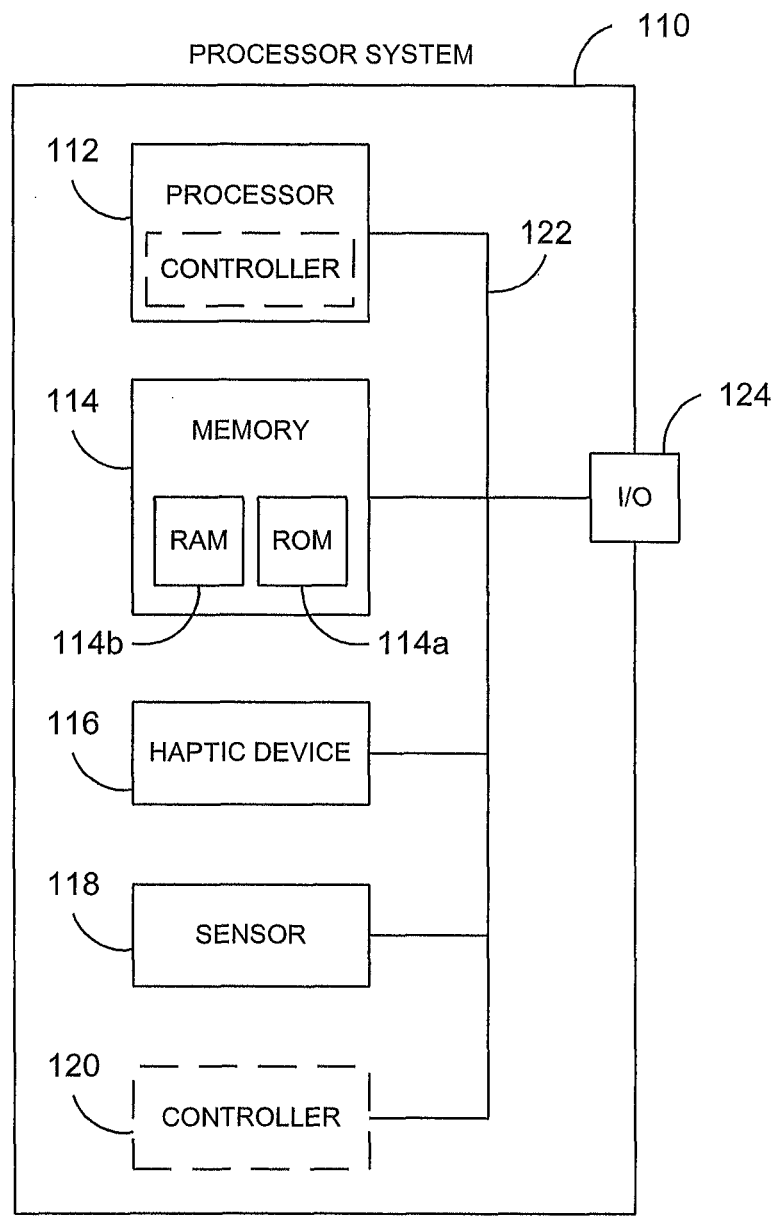
FIG. 1 is a block diagram of a processor system, according to an embodiment of the invention.

FIG. 1 is a block diagram of a processor system, according to an embodiment of the invention. The processor system 110 illustrated in FIG. 1 can be, for example, a commercially available personal computer, portable electronic device, or a less complex computing or processing device (e.g., a device that is dedicated to performing one or more specific tasks). For example, the processor system can be a mobile telephone, a PDA, a portable gaming system, an MP3 player, or the like. Alternatively, the processor system 110 can be a terminal dedicated to providing an interactive virtual reality environment, such as a gaming system, or the like. Although each component of the processor system 110 is shown as being a single component in FIG. 1, the processor system 110 can include multiple numbers of any components illustrated in FIG. 1. Additionally, multiple components of the processor system 110 can be combined as a single component.

The processor system 110 includes a processor 112, which according to one or more embodiments of the invention, can be a commercially available microprocessor capable of performing general processing operations. Alternatively, the processor 112 can be an application-specific integrated circuit (ASIC) or a combination of ASICs, which is designed to achieve one or more specific functions, or enable one or more specific devices or applications. In yet another alternative, the processor 112 can be an analog or digital circuit, or a combination of multiple circuits.

Alternatively, the processor 112 can optionally include one or more individual sub-processors or coprocessors. For example, the processor can include a graphics coprocessor that is capable of rendering graphics, a math coprocessor that is capable of efficiently performing complex calculations, a controller that is capable of controlling one or more devices, a sensor interface that is capable of receiving sensory input from one or more sensing devices, and so forth.

The processor system 110 can also include a memory component 114. As shown in FIG. 1, the memory component, 114 can include one or more types of memory. For example, the memory component 114 can include a read only memory (ROM) component 114a and a random access memory (RAM) component 114b. The memory component 114 can also include other types of memory not illustrated in FIG. 1 that are suitable for storing data in a form retrievable by the processor 112. For example, electronically programmable read only memory (EPROM), erasable electrically programmable read only memory (EEPROM), flash memory, as well as other suitable forms of memory can be included within the memory component 114. The processor system 110 can also include a variety of other components, depending upon the desired functionality of the processor system 110. The processor 112 is in communication with the memory component 114, and can store data in the memory component 114 or retrieve data previously stored in the memory component 114.

The processor system 110 can also include a haptic device 116, which is capable of providing a variety of haptic output. For example, the haptic device 116 can be configured to output basis haptic effects, such as periodic effects, magnitude-sweep effects, or timeline haptic effects, each of which is described in greater detail below. According to one or more embodiments of the invention, the haptic device 116 can include one or more force-applying mechanisms, which are capable of outputting haptic effects or force, to a user of the processor system 110 (e.g., via the housing of the processor system 110). These effects or forces can be transmitted, for example, in the form of vibrational movement caused by the haptic device 116 (e.g., caused by a rotating mass, a piezo-electric device, or other vibrating actuator), or in the form of resistive force caused by the haptic device 116.

The processor system 110 can also, according to one or more embodiments of the invention, include a sensor 118 that is capable of receiving input from a user, the haptic device 116, or is otherwise capable of sensing one or more physical parameters. For example, according to one or more embodiments of the invention, a sensor 118 can be configured to measure speed, intensity, acceleration, or other parameters associated with a haptic effect output by the haptic device 116. Similarly, the sensor 118 can be configured to sense environmental or ambient conditions of the processor system's surroundings. The sensor 118 can interface and communicate with the processor 112 by way of a sensor interface (not shown) within the processor 112.

The processor system 110 can also include a controller 120, which can optionally be internal to the processor 112, or external thereto, as shown in FIG. 1. The controller 120 can be configured to control the haptic device 116 when the processor 112 is not directly controlling the haptic device 116. Similarly, the controller 120 can control the memory 114 and/or the sensor 118, as well as devices external to the processor system 110 by way of an input/output (I/O) component 124 (described below).

The various components of the processor system 110 can communicate with one another via a bus 122, which is capable of carrying instructions from the processor 112 and/or the controller 120 to other components, and which is capable of carrying data between the various components of the processor system 110. Additionally, signals received via the sensor 118 can be communicated to the processor 112 or the controller 120 by way of the bus 122. Data retrieved from or written to memory 114 can be carried by the bus 122, as are instructions to the haptic device 116. Instructions to the haptic device 116 can be provided in the form of haptic-effect signals (e.g., basis haptic-effect signals), for example, which can be provided by the processor 112, the controller 120, or devices external to the processor system 110.

The components of the processor system 110 can communicate with devices external to the processor system 110 by way of an input/output (I/O) component 124 (accessed via the bus 122). According to one or more embodiments of the invention, the I/O component 124 can include a variety of suitable communication interfaces. For example, the I/O component 124 can include, for example, wireless connections, such as infrared ports, optical ports, Bluetooth wireless ports, wireless LAN ports, or the like. Additionally, the I/O component 124 can include, wired connections, such as standard serial ports, parallel ports, universal serial bus (USB) ports, S-video ports, large area network (LAN) ports, small computer system interface (SCSI) ports, and so forth.

Figure 2:
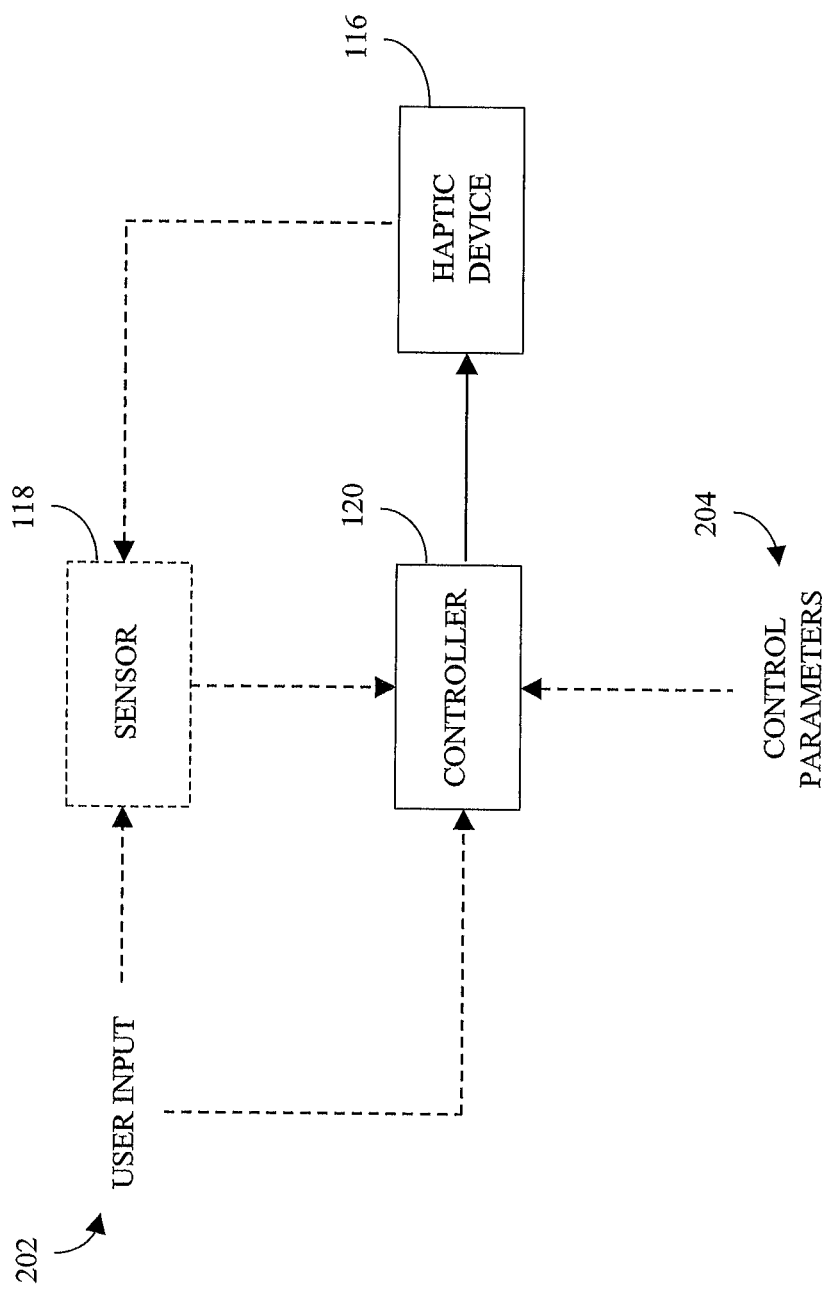
FIG. 2 is a diagram illustrating a haptic device, a controller, and a sensor, according to an embodiment of the invention.

FIG. 2 is a diagram illustrating a haptic device, a controller, and a sensor, according to an embodiment of the invention. FIG. 2 also shows data values provided to the system (e.g., user input 202 and control parameters 204). The elements shown in FIG. 2 can be used with the processor system 110, or a similar device.

The controller 120 is configured to output control signals that are configured to cause haptic effects to be output by the haptic device 116. As shown in FIG. 2, user input 202 can optionally be provided (e.g., via the I/O component 124 shown in FIG. 1) and/or received by an optional sensor 118. The user input 202 can also optionally be provided directly to a controller 120 (e.g., by way of the sensor 118, or some other devices configured to accept and convey user input). The sensor 118 can also optionally receive information from the haptic device 116. For example, the sensor 118 can sense the actual movements of the haptic device 116.

According to an arrangement of the system shown in FIG. 2, the controller 120 can optionally receive data from the sensor 118, and can optionally receive user input 202 and control parameters 204. Based on any data received from the sensor 118, any received user input 202, and/or any received control parameters 204, the controller 120 controls the haptic output of the haptic device 116 (e.g., the controller 120 sends control signals configured to cause haptic effects). For example, the controller 120 can execute a feedback algorithm, controlling the haptic device 116 based on feedback received from the haptic device 116. The controller 120 controls the output of the haptic device 116 by a control signal that the controller 120 outputs to the haptic device 116.

The control signal output by the controller 120 can be based on a number of parameters, including, for example, control parameters 204. For example, control parameters 204 and other parameters that can be used by the controller 120 to control the haptic device 116 can be stored in the memory component 114 of the processor system 110, or by another suitable memory component. For example, the control parameters 204 can include input from an electronic system, a portable gaming device, a cellular telephone, or the like. According to one or more embodiments of the invention, the controller receives control parameters (e.g., gaming device input, cellular telephone input, etc.), and does not include a sensor. According to such embodiments, user input can optionally be received directly by the controller, or can be omitted entirely, depending upon the desired function of the system in which the controller is used.

According to one or more embodiments of the invention, the system shown in FIG. 2 can be used in a stand-alone device, such as a mobile telephone, portable electronic device (e.g., a PDA, etc.), or other device. In a mobile telephone embodiment, for example, haptic output can be provided in the form of haptic effects via the haptic device 116 in response to status events (e.g., a message received signal, a network indicator signal, etc.), user input (e.g., mode changes, keypad dialing, option selections, etc.), incoming calls, or other events. Alternatively, the system shown in FIG. 2 can be used in a configuration where a processor, such as the processor 112 of the processor system 110 shown in FIG. 1, can be connected to an external device, and the processing tasks can be divided among the devices, as desired.

The controller 120 can generate a variety of different control signals to drive the haptic device 116, several of which will be described in greater detail below. For example, the controller 120 can send a control signal to the haptic device 116, which is configured to cause the haptic device 116 to output a corresponding haptic effect. Examples of such control signals include, pulse width modulation (PWM) signals (e.g., pulse signals having a given duty cycle), sinusoidal signals, and other periodic signals (e.g., triangle waves, square waves, etc.). Additionally, the controller 120 can modulate control signals using one or more haptic envelopes.

The controller 120 also can be configured to provide a lead-in pulse at the beginning of a control signal, and/or a braking pulse, at the end of a control signal, which are configured to decrease response time of the haptic device 116. For example, the lead-in signal reduces the time for the haptic device 116 to initiate outputting a haptic effect associated with the control signal. The braking pulse, on the other hand, decreases the time it takes for the haptic device 116 to cease a haptic effect currently being output. In addition to signals described above, such as periodic signals, the controller 120 can output a variety of other control signals, such as non-periodic signals, that are configured to cause the haptic device 116 to output haptic effects.

Figure 3:
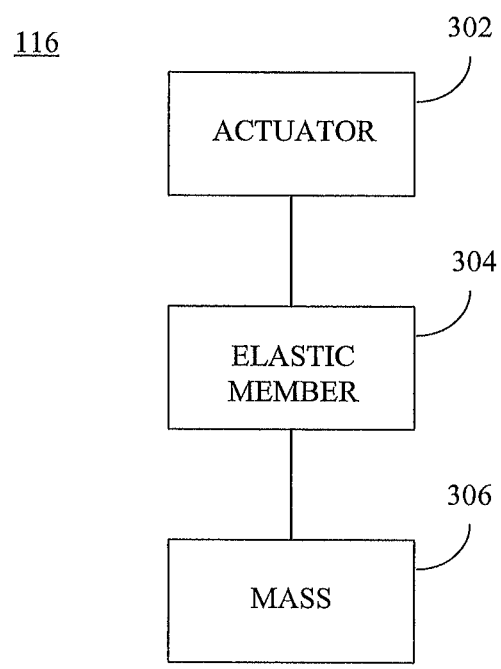
FIG. 3 is a block diagram of a haptic device, according to an embodiment of the invention.

FIG. 3 is a block diagram of a haptic device 116 shown in FIGS. 1 and 2. As shown in FIG. 3, the haptic device 116 includes an actuator 302, an elastic member 304 and a mass 306. The haptic device 116 is configured to provide haptic feedback. The actuator 302 is operably connected to the elastic member 304, and the elastic member 304 is operably connected to the mass 306. The actuator 302 can include, for example, a motor (e.g., a brush motor, a brushless motor, etc.). The elastic member can provide a desired amount of coupling rigidity between the actuator and the mass 306.

When control signals are received by the haptic device 116, the actuator 302 provides force to the elastic member 304. Some of the force applied to the elastic member 304 is translated to the mass 306, and causes the mass 306 to move. By causing the mass 306 to move, haptic effects commanded by the control signals are output by the haptic device, and can be output to a user. The actuator 302 can be configured, for example, to cause the mass to rotate in response to the control signals received by the haptic device. Alternatively, the actuator can move the mass 306 in other directions (e.g., vibrating the mass, moving the mass laterally, etc.).

The configuration shown in FIG. 3 is only one example of a configuration of a haptic device 116. Other configurations that vary from the configuration shown in FIG. 3 can be used as a haptic device 116, according to one or more embodiments of the invention. For example, the elastic member 304 can be coupled to the mass 306 by a flexible coupling; the elastic member 304 can be coupled to the actuator 302 by a flexible coupling. In an alternative embodiment, the elastic member can be coupled between actuator and a mechanical ground, and the actuator can be directly coupled to the actuator. Examples of haptic devices that can be used in connection with one or more embodiments of the invention include an eccentric-rotating-mass (ERM) haptic device and a harmonic ERM (HERM) haptic device, described in detail in U.S. patent application Ser. No. 10/301,809, issued as U.S. Pat. No. 7,161,580, which is incorporated by reference herein in its entirety.

Figure 4:
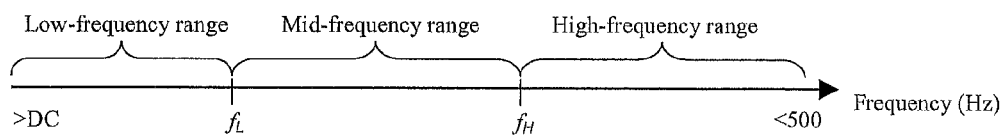
FIG. 4 is a diagram of multiple frequency ranges of haptic effects output by a haptic device, according to an embodiment of the invention.

FIG. 4 is a diagram of multiple frequency ranges of haptic effects that can be output by a haptic device 116, according to an embodiment of the invention. A low-frequency range extends from approximately DC (i.e., 0 Hz) to a low-frequency limit $f_L$, which can vary depending upon the control signal being used to cause a haptic effect and the desired characteristics of the haptic effect. A mid-frequency range extends from the low-frequency threshold frequency $f_L$ to a high-frequency threshold frequency $f_H$, which can vary depending upon the control signal being used to cause a haptic effect and the desired characteristics of the haptic effect. A high-frequency range extends from the high-frequency threshold frequency $f_H$ to all higher frequencies.

According to one or more embodiments of the invention, at least one frequency range from the frequency ranges shown in FIG. 4 can have an audio output associated with the haptic effect. The audio output can occur for haptic effects having a frequency within the at least one frequency range or for haptic effects having a frequency beyond the at least one frequency range, depending upon the desired performance of the system.

For example, according to one or more embodiments of the invention, the mid-frequency range shown in FIG. 4 can have an audio output associated with a haptic effect having a frequency within the mid-frequency range. The haptic effect having a frequency within the mid-frequency range can be varied in a manner such that the associated audio output varies, while any changes in the frequency of the haptic effect remains tactilely undetectable to a user. Because the audio output varies (e.g., changes frequency of the audio output), a user aurally detects the change in the audio output, and believes that he or she has tactilely detected a change in the haptic effect. Said another way, by varying the audio output, the user may perceive that the overall effect (the combination of a haptic effect and an audio effect) has changed and attribute such a change, at least in part, to the user's tactile experience. Additionally, in one or more embodiments, the average energy of a control signal used to cause the haptic effect to be output can be maintained substantially the same while the associated audio output is varied, causing a user to detect an increase in the audio output and believe that he or she has tactilely perceived a change in the haptic effect.

Although FIG. 4 illustrates only three frequency ranges, the number of frequency ranges used according to one or more embodiments of the invention can be varied. For example, many more frequency ranges can be used, among which multiple frequency ranges can include an audio output associated with the haptic effects having frequencies within those frequency ranges.

Haptic effects having frequencies within each of the frequency ranges shown in FIG. 4 can be separately controlled. This can occur, for example, using a single controller, that separately controls the haptic effects associated with each of the frequency ranges shown in FIG. 4. Alternatively, each frequency range shown in FIG. 4 can have a uniquely associated controller, which is configured to control haptic effects having frequencies within that frequency range.

Figure 5:
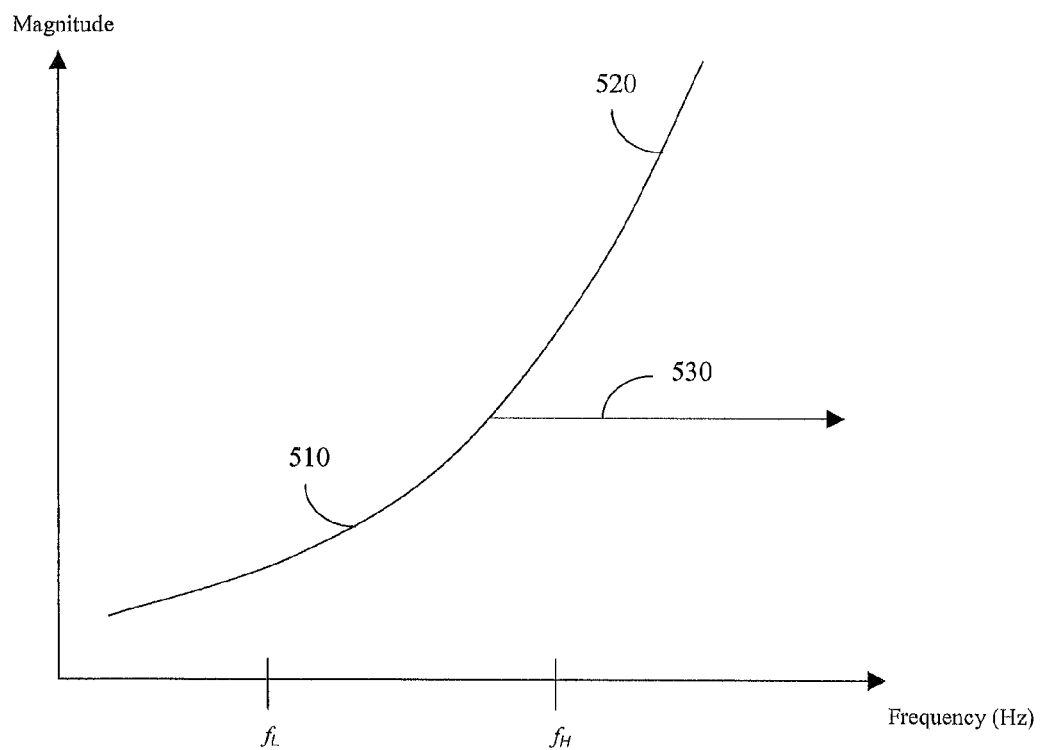
FIG. 5 is a plot of a magnitude versus frequency response of a haptic device, according to an embodiment of the invention.

FIG. 5 is a plot of a magnitude versus frequency of a haptic effect, according to an embodiment of the invention. The plot shown in FIG. 5 is not drawn to scale, and is intended only as an example of the correlation between the magnitude and frequency of a haptic effect, and how a user perceives them. The magnitude versus frequency response shown in FIG. 5 indicates that, as the frequency of a haptic effect is increased, the magnitude of that haptic effect appears also to increase to a user. A first portion 510 of the curve shown in FIG. 5 represents a region of haptic effect frequencies within which a user can detect changes in frequency. Within some region of frequencies (e.g., beginning near the high-frequency threshold frequency $f_H$ in the plot of FIG. 5), referred to as a diminished sensitivity region, a user perceives some increases in the frequency of a haptic effect as increases in magnitude (and not the frequency) without being able to detect tactilely the increases in frequency. A second portion 520 of the curve shown in FIG. 5 represents this region, where the user has difficulty tactilely detecting changes in frequency. Near where the diminished-sensitivity region begins (i.e., the area of intersection of the first portion 510 and the second portion 520 of the curve shown in FIG. 5), a user's perception of increasing frequencies of combination of a haptic effect and audio output is illustrated using a line 520. Similar lines can be drawn to illustrate a user's perception of increasing frequencies of a combination of a haptic effect and an audio output is generated by the haptic device.

According to one or more embodiments of the invention, a pulse-like, periodic control signal is configured to cause the haptic effects to be output having frequencies within each of the ranges shown in FIG. 4. Examples of such signals are discussed in greater detail below. Generally speaking, the period between pulse features of the control signal corresponds to a low-frequency component (e.g., a haptic envelope) of a haptic effect at lower frequencies. At lower frequencies, it is these low-frequency components (perceived as pulses) that are most easily tactilely detected by a user. As the period between the pulses of the control signal decreases (i.e., the frequency of the pulses increases), the haptic device 116 reaches a state where it is moving almost the entire period, even during the portions of the period when no pulse in the control signal exists. Over increasing control signal frequencies where this begins to occur, the haptic device 116 is said to be operating in "saturation mode." For example, in the case of a rotating-mass device, when the haptic device 116 reaches the saturation mode, despite the fact that the control signal pulses are not continuously on and, therefore, are causing low-frequency components in the haptic effect, the mass of the device continues to rotate. The saturation mode may or may not correspond to the diminished sensitivity region, depending upon the physical characteristics of the haptic device 116 or other parameters.

When an audio output associated with a haptic effect is output at the same time as the haptic effect, a user perceives the frequency of the haptic effect to increase due to an increase in the frequency of the audio output. This is illustrated, for example, by a line 530 extending from the magnitude versus frequency curve shown in FIG. 5. This perceived change in frequency of the haptic effect due to the audio output can occur, for example, at the beginning of the diminished-sensitivity region (i.e., where it begins to be difficult for a user to tactilely detect variations in frequency). According to one or more embodiments of the invention, the perceived increased frequency of the haptic effect occurs when the haptic device is being driven within the mid-frequency range (i.e., a frequency between $f_L$ and $f_H$), as shown in FIG. 5. Using the audio output to increase the frequency range a user perceives a haptic device to have allows a user to experience an increased perceived frequency range in the overall experience, and specifically the perceived haptic effect, without being limited by the performance range of the haptic device. Although not shown, multiple lines similar to the illustrated line 530 can be used to represent an audio output changing the frequency that a user perceives either within or outside of the diminished-sensitivity region. Also, although the line 530 representing a frequency perceived by a user indicates an essential constant perceived magnitude, it also is possible to change the magnitude perceived by a user, depending upon the audio output that is produced.

Several signals are described below in greater detail. These signals are only examples, however, and it should be recognized that there are many other signals that are suitable for acting as control signals, depending upon the desired haptic effects to be output and audio output to be produced. Examples of control signals that can be used in connection with one or more embodiments of the invention are described in detail in copending U.S. patent application Ser. No. 09/669,029, now abandoned, and Ser. No. 10/671,465, now U.S. Pat. No. 7,446,752, each of which is incorporated by reference herein in its entirety. Similarly, other control signals, as well as haptic devices that can be used in connection with one or more embodiments of the invention are described in detail in U.S. Pat. No. 6,275,213, which is incorporated by reference herein in its entirety.

Figure 6:
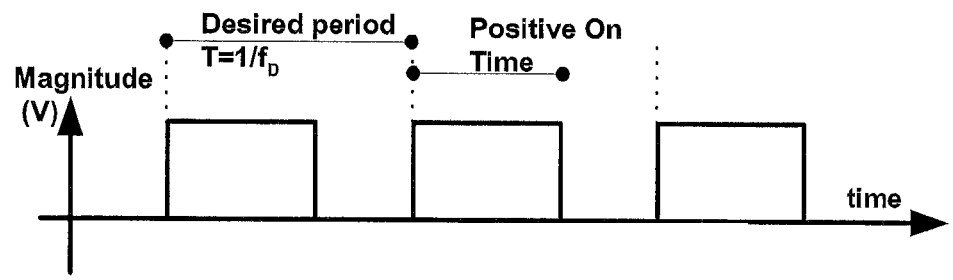
FIG. 6 is a diagram of a control signal used to control a haptic device, according to an embodiment of the invention.

FIG. 6 is a diagram of a control signal used to control a haptic device, according to an embodiment of the invention. The control signal shown in FIG. 6 can be used to closely control the frequency of a haptic effect. The control signal shown in FIG. 6 is a series of pulses, each having a positive on-time. The pulses are periodic, having a period that corresponds to the desired frequency of the haptic effect to be output, as defined by Equation 1 below:

$$t = \frac{1}{f_D}, \quad (1)$$

where T is the period of the control signal (i.e., the time period between two adjacent pulses of the control signal), and $f_D$ is the desired frequency of the output of the haptic effect.

Changes in magnitude of a haptic effect caused by the control signal shown in FIG. 6 can be conveyed by proportional changes of magnitude of the pulses of that control signal. A change in magnitude of the output haptic effect that is based on the control signal shown in FIG. 6 varies proportionately to the change in magnitude of the control signal. The duration of the pulses (i.e., the positive on-time or duty cycle) can be selected according to the values shown in Table 1 below to provide a distinct frequency pattern, depending upon the frequency range of the haptic effect being selected.

TABLE 1

Duty cycle/on-time values for control signal of FIG. 6

| Frequency Range | Frequencies | Duty Cycle/On-Time |
| --- | --- | --- |
| Low | $f_D \leq 6.66$ Hz | 75 ms |
| Mid | 6.66 Hz $< f_D \leq$ 10 Hz | 50% |
| High | 10 Hz $< f_D \leq$ 100 Hz | 50% @ 10 Hz |
| | $f_D >$ 100 Hz | 100% @ 100 Hz and above |

The frequency ranges shown in Table 1 above can correspond to the three ranges shown in FIG. 4 (with "other" being included in the high-frequency range), according to one or more embodiments of the invention. To achieve higher desired frequencies $f_D$ of a haptic effect, the duty cycle of the control signal is increased. For example, in the transition from 10 Hz to 100 Hz in the high-frequency range, the duty cycle increases from 50% to 100%. This increase in duty cycle can be a linearly increase, or another type of increase, if desired.

The duration of the pulses (i.e., the positive on-time, or duty cycle) can alternatively be selected according to the values shown in Table 2 below to provide a strong haptic effect magnitude, depending upon the frequency range of the haptic effect being selected.

TABLE 2

Duty cycle/on-time values for control signal of FIG. 6

| Frequency Range | Frequencies | Duty Cycle/On-Time |
| --- | --- | --- |
| Low | $f_D \leq 10$ Hz | 75 ms |
| Mid | 10 Hz $< f_D \leq$ 16 Hz | 75% |
| High | 16 Hz $< f_D \leq$ 100 Hz | 50% @ 10 Hz |
| | $f_D >$ 100 Hz | 100% @ 100 Hz and above |

The frequency ranges shown in Table 2 above can also correspond to the three ranges shown in FIG. 4 (with "other" being included in the high-frequency range), according to one or more embodiments of the invention. To achieve greater magnitude of a haptic effect, the length of the duty cycle of the control signal is increased in the high-frequency range. As discussed above, the duty cycle can be increased linearly, or in some other desirable manner.

Figure 7:
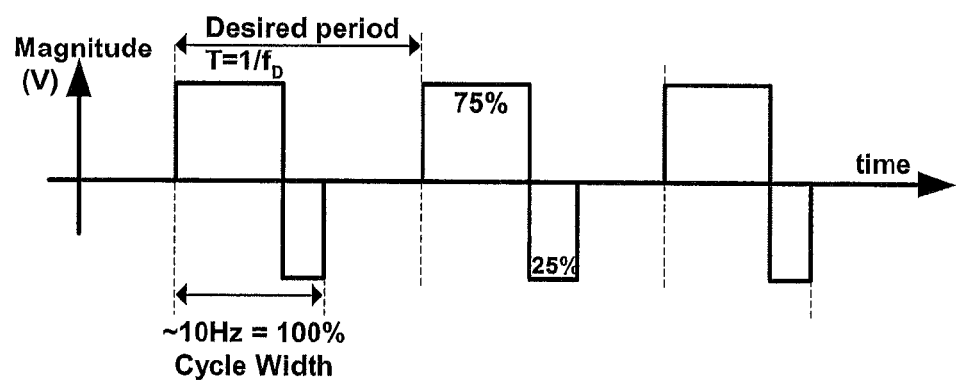
FIG. 7 is a diagram of a control signal used to control a haptic device, according to an embodiment of the invention.

FIG. 7 is a diagram of a control signal used to control a haptic device, according to another embodiment of the invention. The control signal shown in FIG. 7 is a bi-directional control signal that includes multiple bi-directional pulses, and is configured to create a haptic effect with a strong magnitude. These bi-directional pulses are periodic, and have a period corresponding to the desired frequency $f_D$ of the haptic effect to be output (defined by Equation 1 above). Seventy-five percent of the bi-directional pulse is a positive pulse portion, and twenty-five percent of the bi-directional pulse is a negative pulse portion. Values associated with the pulse size for various frequency ranges are shown below in Table 3.

TABLE 3

Duty cycle values for control signal of FIG. 7

| Frequency Range | Frequencies | Duty Cycle/On-Time |
| --- | --- | --- |
| Low | $f_D \leq 10$ Hz | 10 Hz (75% V$^+$ pulse, 25% V$^-$ pulse) |
| Mid | 10 Hz $< f_D \leq$ 16 Hz | 75% |
| High | 16 Hz $< f_D \leq$ 100 Hz | 75% @ 16 Hz |
| | $f_D >$ 100 Hz | 100% @ 100 Hz and above |

In Table 3, the three frequency ranges can correspond, for example, to the three frequency ranges shown in FIG. 4. To vary the magnitude of a haptic effect, the magnitude of the pulse is varied proportionally to the desired increase or decrease of magnitude. Haptic effects to be output in the high-frequency range cause a user to perceive that the magnitude and frequency change proportionally to any changes in the desired frequency of the control signal shown in FIG. 7.

Figure 8:
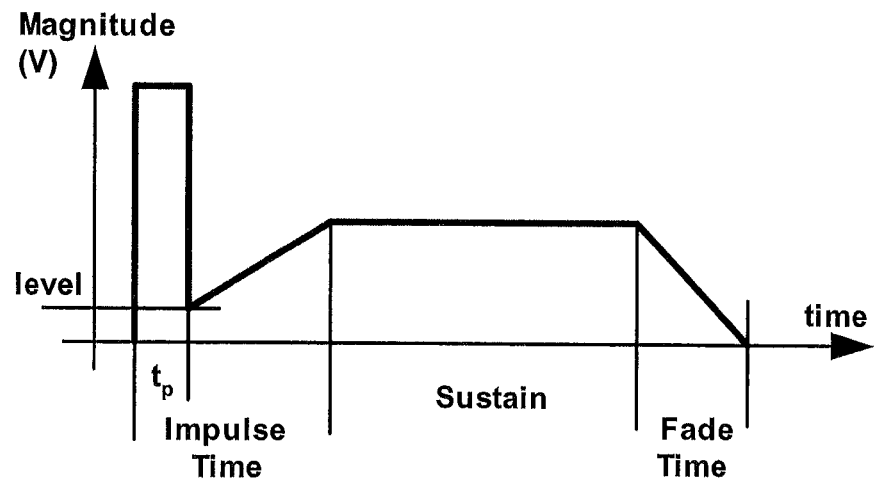
FIG. 8 is a diagram of a control signal used to control a haptic device, according to an embodiment of the invention.

FIG. 8 is a diagram of a control signal used to control a haptic device, according to an embodiment of the invention. The control signal shown in FIG. 8 is a magnitude sweep control signal (also referred to as a "mag-sweep" signal), which sweeps through a variety of magnitude values to cause a desired haptic effect to be output. The magnitude sweep control signal shown in FIG. 8 can cause a corresponding haptic effect to be output, or can be used to modulate another control signal (e.g., a periodic signal such as the signals shown in FIG. 6 and FIG. 7).

A lead-in pulse is provided at the beginning of the control signal shown in FIG. 8, which improves response time of the haptic device being controlled by the control signal. The duration $t_p$ of the pulse is varied as a function of the magnitude level of the beginning of the effect (e.g., at a level desired to begin the impulse portion of the signal, or the ramp-up portion of the signal). The smaller the magnitude levels at the beginning of the effect, the shorter the duration $t_p$ of the lead-in pulse and, similarly, the larger the magnitude levels at the beginning of the signal, the longer the duration $t_p$ of the lead-in pulse. The duration $t_p$ of the pulse can be varied according to the percentage of maximum control signal magnitude (e.g., the voltage magnitude) that one desires to reach by the end of the pulse (e.g., at the value indicated as "level" in FIG. 9 and denoted L in Table 4), as shown below in Table 4.

TABLE 4

Duration of $t_p$ of the lead-in pulse in FIG. 8

| |Maximum Voltage|% | $t_p$ |
|---|---|
| 0% ≤ L ≤ 47% | 0 |
| 47% ≤ L ≤ 70% | 25 ms |
| 70% ≤ L ≤ 100% | 50 ms |

Figure 9:
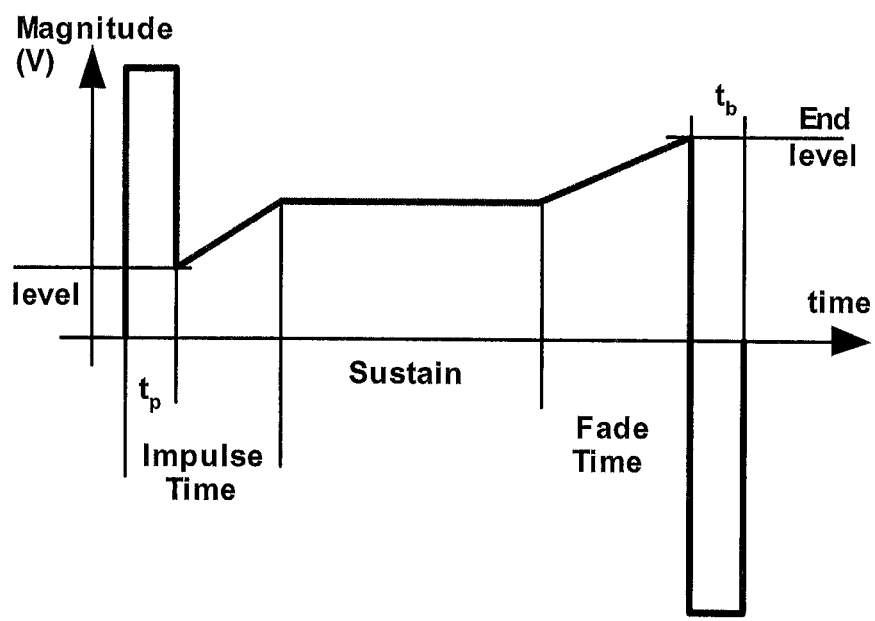
FIG. 9 is a diagram of a control signal used to control a haptic device, according to an embodiment of the invention.

FIG. 9 is a diagram of a control signal used to control a haptic device, according to an embodiment of the invention. The control signal shown in FIG. 9 is a magnitude sweep signal, similar to the control signal shown in FIG. 8, but having both a lead-in pulse and a braking pulse. Because the braking pulse is a negative pulse, the control signal shown in FIG. 9 can also be considered a bi-directional signal. The braking pulse generally is executed to cause a large change in voltage to stop the actuation of a haptic device (i.e., to stop a device from outputting a haptic effect currently being output, such as stopping the rotation of a rotational haptic device).

The braking pulse is of opposite polarity to the lead-in pulse, and the rest of the signal. The duration $t_b$ of the braking pulse varies as a function of the magnitude level of the signal at the end of the effect (i.e., immediately prior to initiating the braking pulse). The smaller the magnitude level at the end of the effect (i.e., at the end of the control signal shown in FIG. 9), the shorter the duration of the braking pulse that is required. Various lengths of possible braking pulses are shown below in Table 5 according to the corresponding percentage of voltage magnitude (e.g., the voltage magnitude) at the end of the signal (e.g., at the value indicated as "End level" in FIG. 10 and denoted EL in Table 5) shown in FIG. 9.

TABLE 5

Duration of $t_b$ of the braking pulse in FIG. 9

| |Maximum Voltage|% | $t_b$ |
|---|---|
| 0% ≤ EL ≤ 47% | 0 |
| 47% ≤ EL ≤ 70% | 25 ms |
| 70% ≤ EL ≤ 100% | 50 ms |

Figure 10:
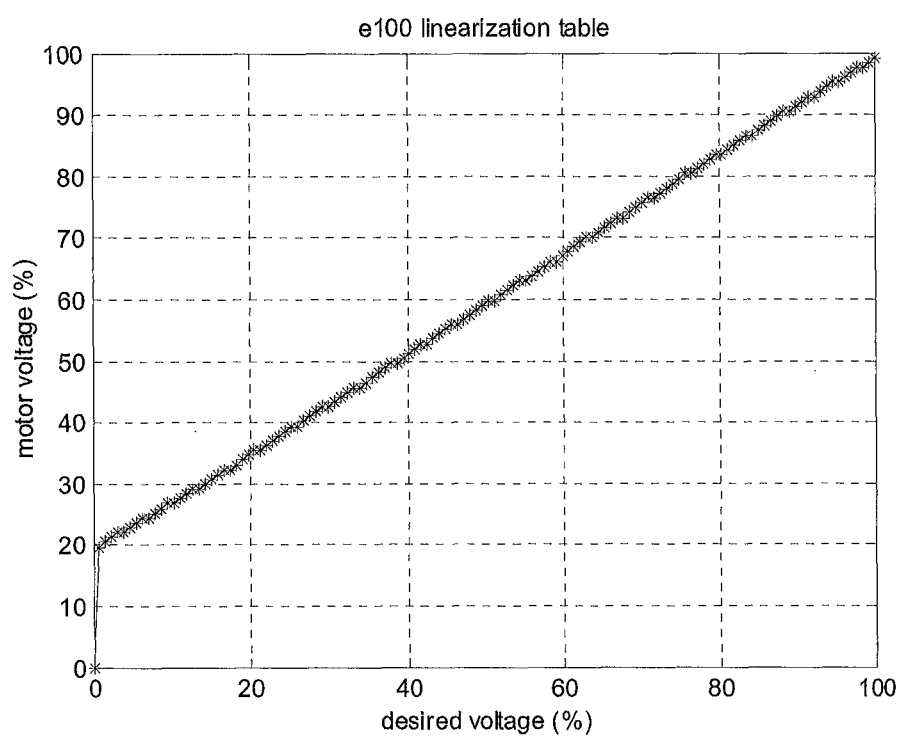
FIG. 10 is a diagram of linearization of voltages of a haptic device, according to an embodiment of the invention.

FIG. 10 is a diagram of linearization of voltages of a haptic device, according to an embodiment of the invention. The actuator of the haptic device may require increased voltage over the desired voltage to initiate and achieve the intended effects. FIG. 10 illustrates an example of a linearization table for such an actuator. As shown in the linearization table of FIG. 10, the percentage of motor voltage to begin movement of the motor can be about twenty percent.

Each of the control signals described above in connection with FIGS. 9-10 can be used with a haptic device that produces an audio output, in addition to outputting a haptic effect, when driven by the control signal. As the control signal changes the rate of movement associated with such haptic devices, the audio output also can change. This can occur, for example, by varying a magnitude, frequency, and/or pulse of the control signal. Thus, by using the control signal to vary the audio output produced by a haptic device, the control signal can cause a user to sense a change in the frequency in the overall effect and to perceive a change in the haptic effect output by the haptic device.

Additional information and examples regarding control signals according to one or more embodiments of the invention are illustrated below in Tables 6-10. For example, Table 6 shows the number of available controller input frequencies for different frequency ranges for the smooth controller. Table 7 shows the number of available controller input frequencies for different frequency ranges for the strong and sharp controllers. Table 8 shows motor inputs for various frequency ranges for smooth, strong and sharp controllers. Table 9 shows desired perceived frequency and perceived magnitude for various frequency ranges for smooth, strong and sharp controllers. Table 10 shows actual acceleration frequency, perceived frequency and perceived magnitude for various frequency ranges for smooth, strong and sharp controllers.

TABLE 6

Controller input frequencies for the smooth controller

| Controller Range | Frequency Range | # of available frequencies at 200 Hz sampling | # of available frequencies at 1 kHz sampling |
|---|---|---|---|
| Low | <6.6 Hz | 170 between (1 Hz and 8 Hz) | 850 between (1 Hz and 6.6 Hz) |
| Transition | 6.6-10 Hz | 10 | 50 |
| High | 10-100 Hz | 19 | 90 |

TABLE 7

Controller input frequencies for the strong and sharp controllers

| Controller Range | Frequency Range | # of available frequencies at 200 Hz sampling | # of available frequencies at 1 kHz sampling |
|---|---|---|---|
| Low | <10 Hz | 180 between (1 Hz and 10 Hz) | 900 between (1 Hz and 10 Hz) |
| Transition | 10-16 Hz | 8 | 37 |
| High | 16-100 Hz | 11 | 52 |

TABLE 8

Motor input for various frequency ranges for smooth, strong and sharp controllers

| Controller Range | Frequency Range | Motor input: Smooth | Motor input: Strong | Motor input: Sharp |
|---|---|---|---|---|
| Low | <6.6 Hz Smooth <10 Hz Strong, Sharp | Unidir Pulse @ 6.6 Hz with 50% duty cycle | Unidir Pulse @ 10 Hz with 75% duty cycle | Bidir Pulse @ 10 Hz with 75% duty cycle |
| Transition | 6.6-10 Hz Smooth 10-16 Hz Strong, Sharp | Unidir Pulse at chosen input frequency at 50% duty cycle | Unidir Pulse at chosen input frequency at 75% duty cycle | Bidir Pulse at chosen input frequency at 75% duty cycle |
| High | 10-100 Hz Smooth 16-100 Hz Strong, Sharp | Unidir Pulse at chosen input frequency and duty cycle increases from 50% to 100% | Unidir Pulse at chosen input frequency and duty cycle increases from 75% to 100% | Bidir Pulse at chosen input frequency and duty cycle increases from 75% to 100% |

TABLE 10

Actual acceleration frequency, perceived frequency and perceived magnitude for various frequency ranges for smooth, strong and sharp controllers

| Controller Range | Controller Input Frequency Range | Actual Acceleration frequency | Perceived frequency | Perceived Magnitude |
|---|---|---|---|---|
| Low | <6.6 Hz Smooth <10 Hz Strong, Sharp | Controller input frequency matches, actual. | Controller input frequency matches perceived. | Perceived magnitude is variable with PWM |
| Transition | 6.6-10 Hz Smooth 10-16 Hz Strong, Sharp | Controller input frequency matches envelope frequency. | User perceives envelope frequency | Perceived magnitude is variable with PWM. |

TABLE 9

Desired perceived frequency and perceived magnitude for various frequency ranges for smooth, strong and sharp controllers

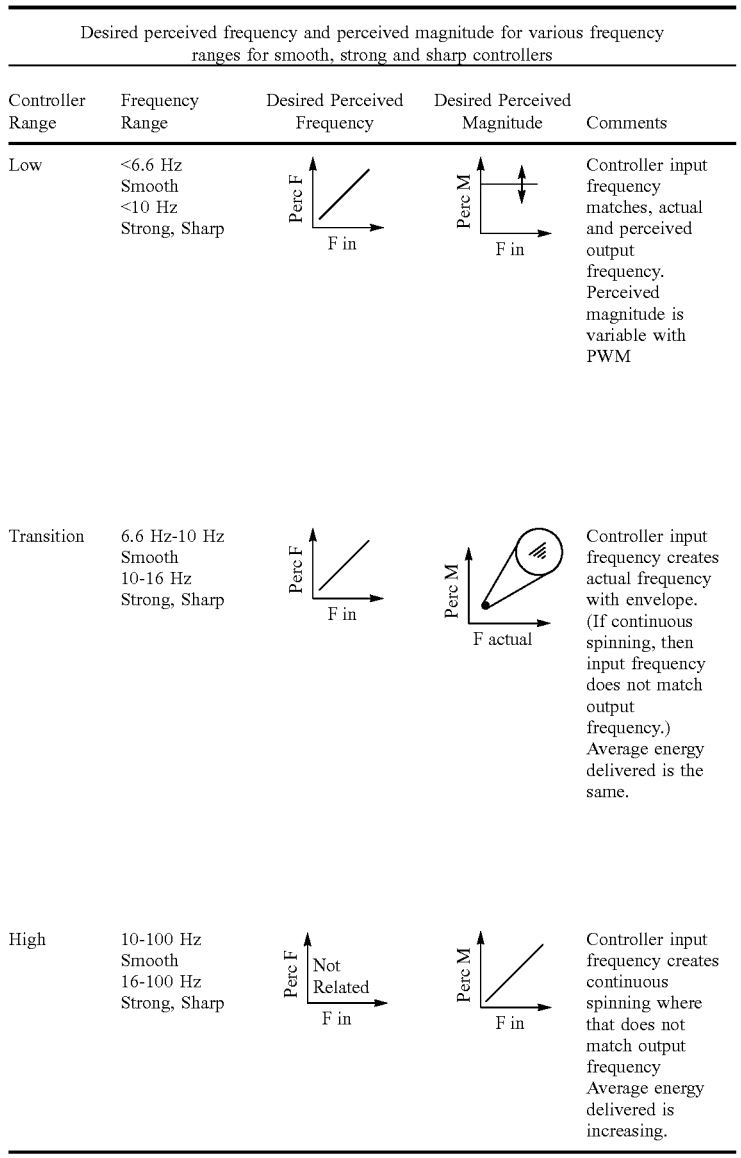

| Controller Range | Frequency Range | Desired Perceived Frequency | Desired Perceived Magnitude | Comments |
|---|---|---|---|---|
| Low | <6.6 Hz Smooth <10 Hz Strong, Sharp | | | Controller input frequency matches, actual and perceived output frequency. Perceived magnitude is variable with PWM |
| Transition | 6.6 Hz-10 Hz Smooth 10-16 Hz Strong, Sharp | | | Controller input frequency creates actual frequency with envelope. (If continuous spinning, then input frequency does not match output frequency.) Average energy delivered is the same. |
| High | 10-100 Hz Smooth 16-100 Hz Strong, Sharp | | | Controller input frequency creates continuous spinning where that does not match output frequency Average energy delivered is increasing. |

TABLE 10-continued

Actual acceleration frequency, perceived frequency and perceived magnitude for various frequency ranges for smooth, strong and sharp controllers

| Controller Range | Controller Input Frequency Range | Actual Acceleration frequency | Perceived frequency | Perceived Magnitude |
|---|---|---|---|---|
| High | 10-100 Hz Smooth 16-100 Hz Strong, Sharp | Controller input frequency does NOT match actual frequency. | Controller input frequency does NOT match perceived frequency. | As controller input frequency is increased, magnitude is perceived to increase. |

Figure 11:
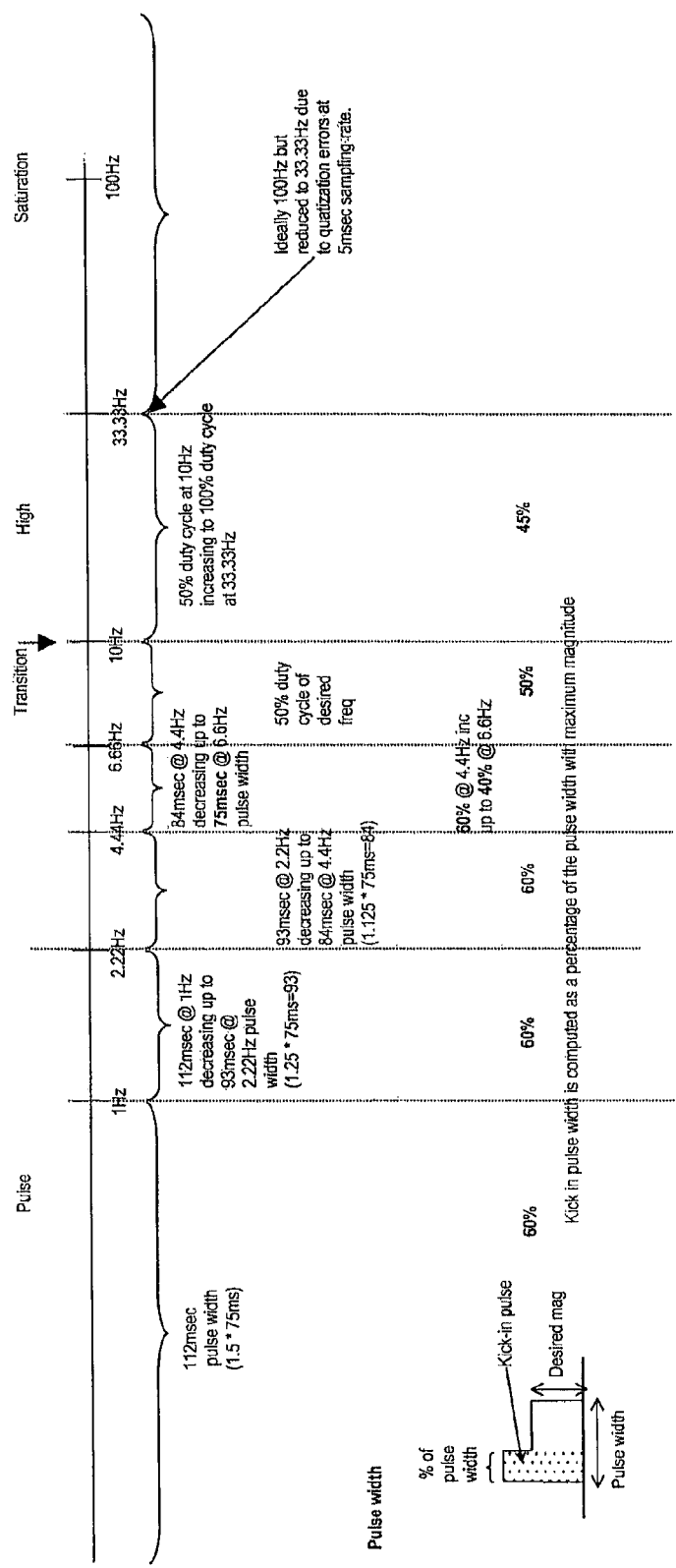
FIG. 11 is a diagram of various parameters associated with a smooth effect according to an embodiment of the invention.
Figure 12:
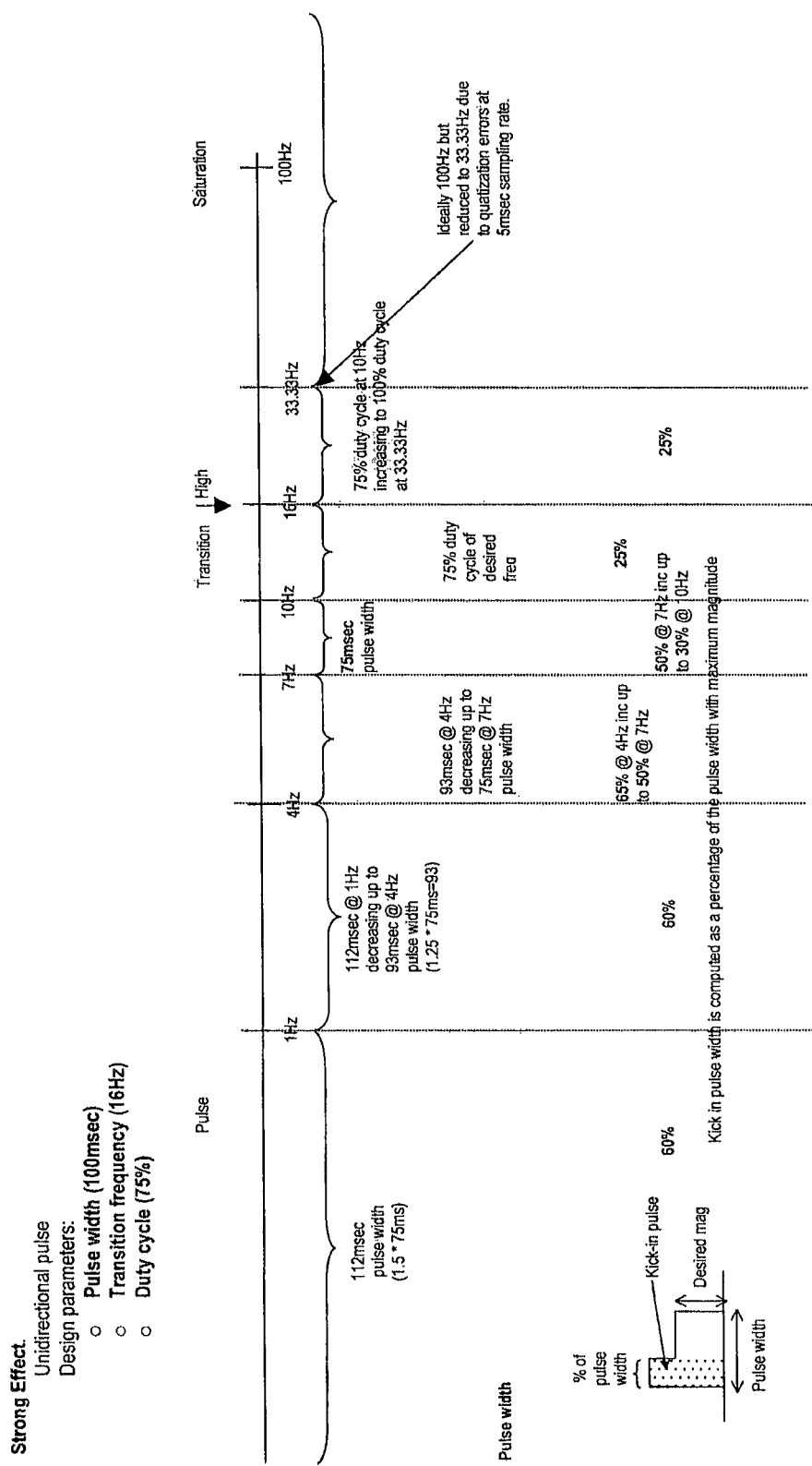
FIG. 12 is a diagram of various parameters associated with a strong effect according to an embodiment of the invention.
Figure 13:
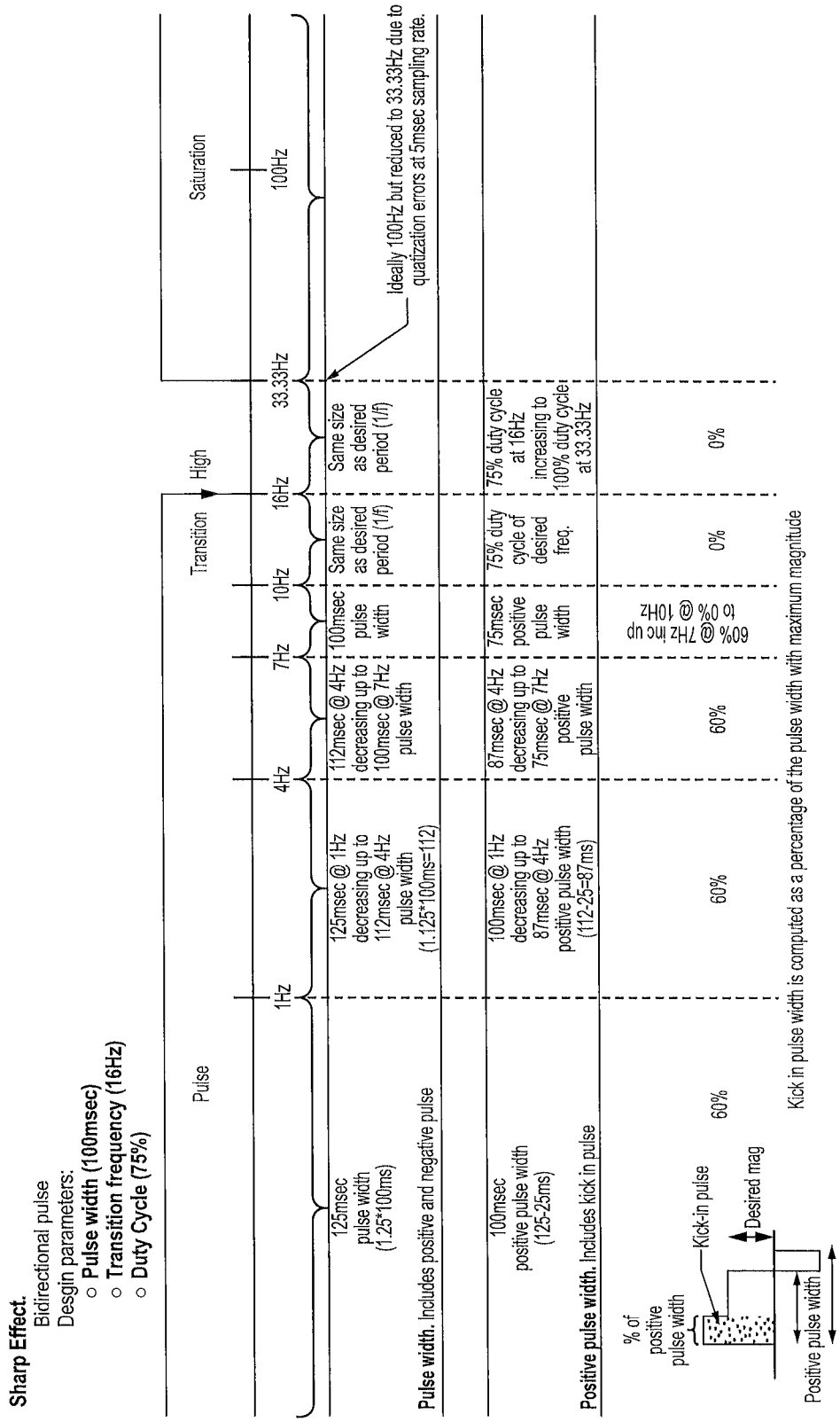
FIG. 13 is a diagram of various parameters associated with a sharp effect according to an embodiment of the invention.

FIG. 11 is a diagram of parameters associated with a smooth effect according to an embodiment of the invention. FIG. 12 is a diagram of parameters associated with a strong effect according to an embodiment of the invention. FIG. 13 is a diagram of parameters associated with a sharp effect according to an embodiment of the invention.

A system and method for controlling audio output associated with haptic effects are discussed. Specific embodiments have been described above in connection with separately controlling multiple frequencies, either using a single controller or using multiple controllers, each of the multiple controllers being equally associated with a frequency range. Additionally, other embodiments have been discussed in connection with controlling an audio output associated with a haptic effect in at least one of the frequency ranges. Also, the audio effect can be changed, such that a user senses a change in frequency in the overall effect and perceives that change in a haptic effect; in some cases, this can occur above the frequency range where a user can tactilely detect variations in frequency (e.g., within a diminished sensitivity region). Thus, as the frequency of the audio effect is increased, the user perceives an increase in a frequency of the haptic effect associated with the audio effect, even where such an increase results in a change in haptic frequencies within the diminished-sensitivity region. Similarly, as the frequency of the audio effect is decreased, the user perceives a decrease in frequency of the corresponding haptic effect, even where such changes result in variations of haptic effect frequencies, which are undetectable to a user (e.g., within the diminished-sensitivity region).

It will be appreciated, however, that embodiments of the invention can be in other specific forms without departing from the spirit or essential characteristics thereof. For example, while some embodiments have been described in the context of periodic or magnitude sweep control signals for causing haptic effects, any suitable signal can be used. Also, although control signals have been described as square-waves or PWM signals having square-wave-like shapes, other pulse shapes can be used. Additionally, although a specific reference has been made to devices configured to output periodic haptic effect (e.g., rotating haptic devices such spinning mass motors, etc.), any type of haptic device capable of outputting haptic effects associated with an audio output can be used according to one or more embodiments of the invention.

The presently disclosed embodiments are, therefore, considered in all respects to be illustrative and not restrictive.

What is claimed is:

1. A method of generating haptic effects for a user of a haptically-enabled system, the method comprising:
    generating a control signal configured to cause a haptic device to output a first haptic effect, wherein the first haptic effect is within a frequency range where changes in a frequency of a haptic effect are tactilely undetectable to the user;
    receiving a request to generate a second haptic effect having a higher frequency than the first haptic effect, wherein the haptic device comprises a rotating mass and the second haptic effect is within the frequency range; and
    modifying the control signal to cause the haptic device to output the second haptic effect using the rotating mass and to cause the haptic device to output an audio output using the rotating mass;
    wherein the first haptic effect and the second haptic effect as output by the haptic device are both within the frequency range, and the audio output is configured to cause the user to perceive the second haptic effect to comprise the higher frequency than the first haptic effect.

2. The method according to claim 1, wherein an average energy of the first haptic effect and the second haptic effect output by the haptic device are substantially the same.

3. The method according to claim 1, wherein modifying the control signal comprises changing a magnitude, frequency and/or pulse of the control signal.

4. The method according to claim 1, wherein a frequency of the audio output is greater than a frequency of the second haptic effect.

5. The method according to claim 1, wherein a perceived frequency of the second haptic effect by the user is greater than an actual frequency of the second haptic effect.

6. The method of claim 1, wherein the frequency range where changes in the frequency of the haptic effect are tactilely undetectable to the user comprises between 10 Hz and 16 Hz.

7. The method of claim 1, wherein the frequency range where changes in the frequency of the haptic effect are tactilely undetectable to the user comprises between 6.6 Hz and 10 Hz.

8. A system comprising:
    a haptic device configured to output vibratory haptic effects to a user; and
    a controller configured to generate a control signal configured to cause the haptic device to output a first haptic effect to the user, wherein the first haptic effect is within a frequency range where changes in a frequency of a haptic effect are tactilely undetectable to the user, receive a request to generate a second haptic effect having a higher frequency than the first haptic effect, wherein the haptic device comprises a rotating mass and the haptic device is in a saturation mode while outputting the first haptic effect, and modify the control signal to cause the haptic device to output the second haptic effect using the rotating mass and to cause the haptic device to output an audio output using the rotating mass;
    wherein the first haptic effect and the second haptic effect output as output by the haptic device are both within the frequency range, and the audio output is configured to cause the user to perceive the second haptic effect to comprise the higher frequency than the first haptic effect.

9. The system according to claim 8, wherein the haptic device comprises an actuator.

10. The system according to claim 9, wherein the haptic device is an eccentric-rotating-mass actuator.

11. The system according to claim 9, wherein the haptic device further comprises an elastic member operatively connected to the actuator and a mass operatively connected to the elastic member.

12. The system according to claim 9, wherein the actuator comprises a motor.

13. The system according to claim 8, wherein an average energy of the first haptic effect and the second haptic effect output by the haptic device are substantially the same.

14. The system according to claim 8, wherein the controller is configured to modify the control signal by changing a magnitude, frequency and/or pulse of the control signal.

15. The system according to claim 8, wherein a frequency of the audio output is greater than a frequency of the second haptic effect.

16. The system according to claim 8, wherein a perceived frequency of the second haptic effect by the user is greater than an actual frequency of the second haptic effect.

17. A non-transitory computer-readable medium having instructions stored thereon that, when executed by a processor, cause the processor to generate haptic effects for a user of a haptically-enabled system, the generating haptic effects comprising:
   generating a control signal configured to cause a haptic device to output a first haptic effect, wherein the first haptic effect is within a frequency range where changes in a frequency of a haptic effect are tactilely undetectable to the user;
   receiving a request to generate a second haptic effect having a higher frequency than the first haptic effect, wherein the haptic device comprises a rotating mass and the second haptic effect is within the frequency range; and
   modifying the control signal to cause the haptic device to output the second haptic effect using the rotating mass and to cause the haptic device to output an audio output using the rotating mass;
   wherein the first haptic effect and the second haptic effect as output by the haptic device are both within the frequency range, and the audio output is configured to cause the user to perceive the second haptic effect to comprise the higher frequency than the first haptic effect.

18. The computer-readable medium of claim 17, wherein an average energy of the first haptic effect and the second haptic effect output by the haptic device are substantially the same.

19. The computer-readable medium of claim 17, wherein modifying the control signal comprises changing a magnitude, frequency and/or pulse of the control signal.

20. The computer-readable medium of claim 17, wherein a frequency of the audio output is greater than a frequency of the second haptic effect.

21. The computer-readable medium of claim 17, wherein a perceived frequency of the second haptic effect by the user is greater than an actual frequency of the second haptic effect.

* * * * *